US006650795B1

(12) United States Patent
Motta

(10) Patent No.: US 6,650,795 B1
(45) Date of Patent: Nov. 18, 2003

(54) COLOR IMAGE CAPTURING SYSTEM WITH ANTIALIAZING

(75) Inventor: Ricardo J. Motta, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/371,669

(22) Filed: Aug. 10, 1999

(51) Int. Cl.[7] .................................................. G06K 7/00
(52) U.S. Cl. ...................................... 382/312; 358/513
(58) Field of Search ................................. 358/500, 505, 358/513, 518, 474, 473, 482; 382/312, 313, 315, 321

(56) References Cited

U.S. PATENT DOCUMENTS

| | | | |
|---|---|---|---|
| 4,334,238 A | 6/1982 | Morishita et al. ............. 358/43 |
| 4,605,956 A | 8/1986 | Cok ............................ 358/44 |
| 4,630,307 A | 12/1986 | Cok ............................ 382/25 |
| 4,642,678 A | 2/1987 | Cok ............................ 358/44 |
| 4,716,455 A | 12/1987 | Ozawa et al. ................. 358/44 |
| 4,725,880 A | 2/1988 | Dischert ...................... 358/43 |
| 4,988,984 A | 1/1991 | Gonzalez-Lopez .......... 340/728 |
| 5,032,910 A | 7/1991 | Cok ............................ 358/13 |
| 5,040,064 A | 8/1991 | Cok ............................ 358/163 |
| 5,053,861 A | 10/1991 | Tszi et al. ..................... 358/13 |
| 5,065,229 A | 11/1991 | Tsai et al. ..................... 358/21 |
| 5,237,446 A | 8/1993 | Takahashi |
| 5,257,326 A | 10/1993 | Ozawa et al. ................. 382/54 |
| 5,307,159 A | 4/1994 | Heida ........................ 348/235 |
| 5,373,322 A | 12/1994 | Laroche et al. ............. 348/273 |
| 5,382,976 A | 1/1995 | Hibbard ...................... 348/273 |
| 5,506,619 A | 4/1996 | Adams et al. ............... 348/272 |
| 5,552,827 A | 9/1996 | Maenaka et al. ........... 348/266 |
| 5,581,298 A | 12/1996 | Sasaki et al. ............... 348/222 |
| 5,596,367 A | 1/1997 | Hamilton, Jr. et al. ...... 348/272 |
| 5,629,734 A | 5/1997 | Hamilton, Jr. et al. ...... 348/222 |
| 5,652,621 A | 7/1997 | Adams, Jr. et al. ......... 348/272 |
| 5,675,425 A | 10/1997 | Imoto et al. ................ 358/513 |
| 5,748,770 A | 5/1998 | Hajjahmad et al. ......... 382/167 |
| 5,768,023 A | * 6/1998 | Sawaki ....................... 359/622 |
| 5,778,106 A | 7/1998 | Juenger et al. ............. 382/275 |
| 5,805,217 A | 9/1998 | Lu et al. .................... 348/273 |
| 5,808,674 A | 9/1998 | Adams, Jr. et al. ......... 348/273 |
| 5,852,468 A | 12/1998 | Okada ....................... 348/272 |
| 5,877,866 A | 3/1999 | Noguchi .................... 358/296 |
| 5,889,554 A | 3/1999 | Mutze ....................... 348/273 |

FOREIGN PATENT DOCUMENTS

| | | | |
|---|---|---|---|
| DE | 3315585 C2 | 10/1984 | ............ H04N/1/46 |
| DE | 3837063 C1 | 10/1988 | ............ H04N/1/46 |
| EP | 0865196 A2 | 9/1998 | ............ H04N/1/48 |
| GB | 2320157 A | 6/1998 | ..................... 5/225 |
| JP | 600096063 | 5/1985 | ......... H04N/1/028 |
| JP | H11-215514 | 8/1999 | |
| JP | 2000287048 | * 10/2000 | ............ H04N/1/19 |
| WO | WO 86/00484 A | 1/1986 | ............ H04N/9/07 |

* cited by examiner

Primary Examiner—Jerome Grant

(57) ABSTRACT

In a digital still camera (DSC) a plurality of individual RGB filter elements each overly a corresponding one of a plurality of photosensitive elements of an image sensor such as an array of charge-coupled devices (CCDs). A coated mirror is positioned along a light path between a lens and the image sensor for shifting the light transmitted through the lens so that a portion of the incident light that would otherwise fall on a single photosensitive element is divided between at least two adjacent photosensitive elements. The plurality of individual RGB filter elements are arranged in a predetermined mosaic pattern between the lens and the image sensor for permitting the photosensitive elements to detect the intensity of the light incident thereon in a manner that allows a high quality color image to be reproduced. A processing circuit is mounted in the housing and is connected to the image sensor for processing the output signals from the image sensor. A control circuit is mounted in the housing and is connected to the processing circuit for generating a color digital still image file and storing the file in a memory. Blurring and undesirable artifacts such as color fringing at the edges of the color digital still image are reduced.

20 Claims, 3 Drawing Sheets

Green Capture
Pattern

Red and Blue
Capture Pattern

COLOR IMAGE CAPTURING SYSTEM WITH ANTIALIAZING

BACKGROUND OF THE INVENTION

The present invention relates to electronic color image capturing systems, and more particularly, to a color image capturing system that reduces undesirable artifacts, such as color fringing at the edges.

There are many applications where it is necessary to capture a color image of an object or scene of interest for display and/or storage. These include live video display systems, video cam corders, digital still cameras (DSCs), etc. The traditional techniques for color image capture in consumer electronic devices have limitations in the quality of the reproduced color images which can be understood by describing the operation of conventional DSCs.

In conventional DSCs a large number of charge-coupled devices (CCDs) are arranged in a matrix, which has either a square or a rectangular format. Most DSCs use a matrix or area-array of CCDs because of their ability to capture an image more or less instantaneously, much like a conventional film camera. The matrix of CCDs captures the entire image in one exposure, but it can require several exposures to build full color information. This is because the CCDs are monochromatic, i.e. they can only detect light intensity, not color. Therefore DSCs must use a color filtration system in conjunction with the CCD matrix in order to separate the incoming light into its red, green and blue (RGB); cyan, magenta, yellow (CMY); or other color components. There are several different ways that this color separation can be performed in a DSC.

A first conventional method of color separation in a DSC is the so-called "one-shot, three-chip" approach. All of the color information necessary to generate and store a still digital image is captured in one exposure. As the light enters the camera, a beam splitter, such as a prism, separates the light into its color components and a trilinear CCD chip is used to capture full RGB color component information. Three images, each representing one of the colors, are then realigned with the aid of firmware to form the full color digital still image. Because the human eye is most sensitive to the green spectrum of light, some three-chip DSCs are made with two of the arrays registering green color information and the third array is made up of a mosaic of red and blue filter elements. Since gaps in the red and blue information exist, interpolation is used to create additional color information.

A second conventional method of color separation in a DSC is known as the "three-shot, one-chip" approach. With this approach the DSC uses a filter wheel through which three individual exposures must be made to record the RGB color component information for the digital still image. Three separate images are then combined using the firmware stored in the camera. Problems can arise with this approach where the images are improperly realigned. Also, variations in light emissions during the three exposures can alter the color balance of the final image. Also, the mechanical structures needed to rotate the filter wheel require additional space for an actuating mechanism and are subject to failures.

A third conventional method of color separation in a DSC is known as the "one-chip" approach. With this approach a single integrated circuit contains all of the CCDs and filter elements are utilized, one filter element of a given color be associated with each individual CCD element The red, green and blue filter elements are arranged either in a striped pattern or a mosaic pattern. Some of the one-chip DSCs have image sensors in which there are more green than red and blue filter elements in order to accommodate the fact that the human eye is more sensitive to green in the visual spectrum, as well as the fact that more green improves image resolution.

In the one-chip approach each photosensitive CCD element functions to capture a single pixel of a given color in the final digital still image. At any given pixel location, only one color of light can be sensed, namely, the color of the filter element at that location. Additional color information at that pixel location is lost and must be inferred from neighboring pixels through a process such as interpolation. This process can lead to problems if incorrect color information is assigned to pixels. This is usually most apparent around high contrast edge areas, such as black text, where colored fringes "bleed" into the text. One CCD array mosaic pattern frequently used in one-chip DSCs is the so-called Bayer pattern illustrated in FIG. 1.

Some conventional DSCs use a lower quality lens system or a dispersing element with no optical power such that the image is blurred. This allows light from a given location in the image to be spread across more pixels, compromising picture quality (resolution). Although the resulting digital still image may, or may not, be as clear, certain undesirable artifacts, such as color fringing at the edges, are reduced, making the image more attractive to the user.

SUMMARY OF THE INVENTION

It is therefore the primary object of the present invention to provide a color image capturing system from which reproduced images have reduced undesirable artifacts such as bleeding, fringing and blurring.

It is another object of the present invention to provide a method of capturing color images that reduces undesirable artifacts such as bleeding, fringing and blurring in the reproduced images.

In accordance with the present invention a color image capturing system includes an image sensor that generates output signals representative of an image of an object or a scene of interest. The image sensor includes a plurality of individual photosensitive elements arranged in an array. Each photosensitive element represents a corresponding pixel location in the image. A plurality of individual color filter elements are arranged in a predetermined pattern. Each color filter element is positioned adjacent a corresponding one of the photosensitive elements of the image sensor. An optical element shifts the light transmitted to the image sensor so that a portion of the incident light that would otherwise fall on a single photosensitive element is divided between at least two adjacent photosensitive elements. Blurring and undesirable artifacts such as color fringing at the edges are thereby reduced in the reproduced color images.

The method of the present invention involves transmitting light reflected by an object or scene of interest onto an image sensor. The image sensor includes a plurality of individual photosensitive elements arranged in an array, each photosensitive element representing a corresponding pixel location in the image. Before the light strikes the image sensor it travels through a plurality of individual color filter elements arranged in a predetermined pattern. Each color filter element overlies a corresponding one of the photosensitive elements of the image sensor. The light is shifted by a coated mirror, prism or other suitable optical element before it reaches the color filter elements so that a portion of the light that would otherwise fall on a single photosensitive element is divided between at least two adjacent photosensitive elements. The output signals from the image sensor are processed and a color image is reproduced. Blurring and undesirable artifacts such as color fringing at the edges of the reproduced color image are reduced.

DESCRIPTION OF THE PREFERRED EMBODIMENT

Figure 2:
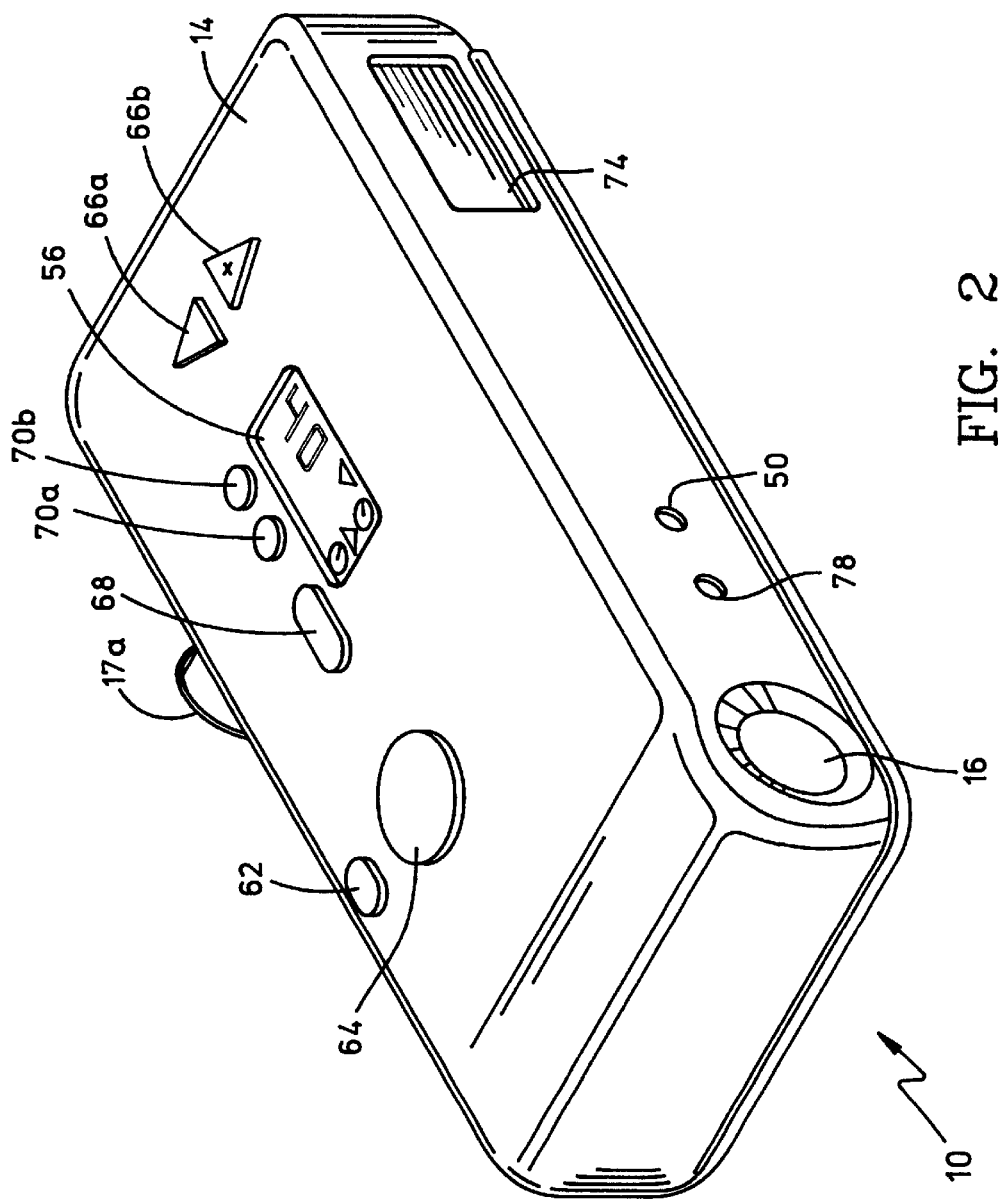
FIG. 2 is a perspective view of a digital still camera constructed in accordance with a preferred embodiment of the present invention.
Figure 3:
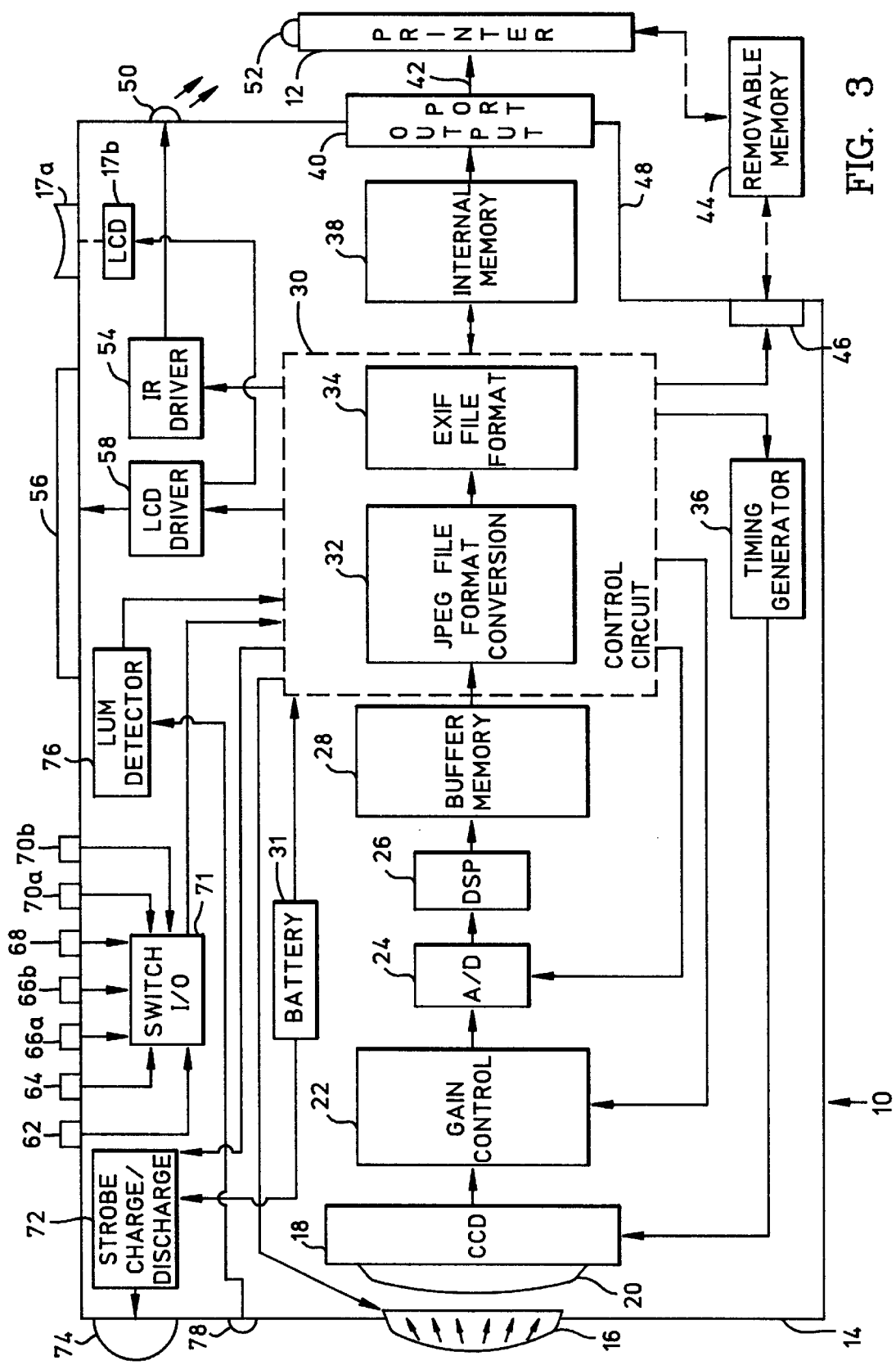
FIG. 3 is a block diagram of the digital still camera of FIG. 2 illustrating its electronic circuitry.

Referring to FIGS. 2 and 3, a color image capturing system is illustrated in the form of a digital still camera (DSC) 10. The camera 10 is capable of transferring digital images to a printer 12 (FIG. 3) via cable connection, removable memory or wireless transmission. Referring to FIG. 2, the camera 10 includes a compact, generally rectangular outer plastic camera body or housing 14 that encloses and supports the operative components of the camera in conventional fashion. A lens 16 is mounted in a forward side wall of the housing 14 for focusing full spectrum light reflected from objects and scenes of interest. An eyepiece 17a (FIGS. 2 and 3) on the rear side wall of the housing 14 forms part of a view finder that allows the user to view objects and/or scenes of interest through the lens 16 or to view electronically recorded images displayed on a small, internal color liquid crystal display (LCD) 17b (FIG. 3). This is accomplished using a pair of pivoting mirrors (not illustrated in FIGS. 2 and 3) inside of the housing 14.

A color image sensor 18 (FIG. 3), preferably in the form of an array of photosensitive elements such as charge coupled devices (CCDs), is mounted in the housing 14 behind the lens 16 for receiving the light transmitted through the lens 16. The image sensor 18 generates analog output signals representative of an image of an object or scene of interest. One of the mirrors inside the housing 14 may be pivoted to selectively send light received through the lens 16 to the eyepiece 17a or the image sensor 18. The other mirror may be pivoted to allow the user to view objects and scenes through the lens 16 or to view electronic images on the internal LCD 17b as indicated by the dashed line in FIG. 3.

Referring to FIG. 3, an array 20 of color filter elements overlies the forward side of the image sensor 18. The analog signals from the image sensor 18 are serially fed to a gain control circuit 22 the output of which is fed to an analog-to-digital (A/D) converter 24. The digital output of the A/D converter 24 is fed to a digital signal processing (DSP) circuit 26, the output of which is fed through a buffer memory 28 to a control circuit 30. The control circuit 30 receives power from a battery 31 and includes a micro-controller or microprocessor as well as a JPEG file format conversion component 32 and an EXIF file format component 34.

Referring still to FIG. 3, light from images and scenes of interest enters the camera 10 through the lens 16 as indicated diagrammatically by the arrows and passes through the color filter elements 20 before striking the active face of the image sensor 18. The color filter elements 20 associated with the various detectors in the CCD array of the image sensor 18 cause the detectors to be sensitive to light of one particular color. Each detector of the CCD array accumulates a charge that represents the amount of light in one CCD pixel.

A timing generator 36 is coupled between the control circuit 30 and the image sensor 18. The timing generator 36 controls the reading of the array of CCD detectors that make up the image sensor 18 in conventional fashion. The charge accumulated by each CCD detector is serially applied to the input of the gain control circuit 22.

The timing generator 36 (FIG. 3) is capable of periodically flushing the CCD array of the image sensor 18. The gain control circuit 22 implements a conventional correlated double sampling process. This double sampling process accounts for overshoot and undershoot in the outputs of the CCD detectors as the output voltages from each of the detectors in the CCD array are read. The A/D converter 24 converts to digital values the analog voltages read from the CCD detectors after they have been adjusted by the gain control circuit 22.

The DSP 26 (FIG. 3) processes the digital signals from the A/D converter 24 so as to provide a demosaic function, and also performs automatic white balance detection and correction, as well as image sharpening functions in accordance with well known techniques. By way of example, the DSP 26 may be provided in the form of Part No. HD49811TFA commercially available from Hitachi. The output of the DSP 26 is a set of image pixels, each of which represents the color of a particular portion of the image that was captured by the CCD array of the image sensor 18. The entire set of image pixels associated with a complete flushing of the CCD array represents a single image of an object or scene of interest whose color "picture" has been "taken" with the camera 10.

The micro-controller of the control circuit 30 (FIG. 3) may execute firmware to provide the JPEG file format conversion component 32. Alternatively, the JPEG file format conversion component may be a dedicated hardware circuit or a combination of hardware and software. The JPEG file formal conversion device compresses the output received from the DSP 26 through the buffer memory 28 in accordance with a well known JPEG data compression standard. The image information which is in JPEG format is fed to the EXIF file format component 34 which embeds the JPEG format image information within a file that conforms to the DIGITAL STILL CAMERA FILE FORMAT STANDARD (Version 1.0, Jul. 13, 1995) commonly known as EXIF. The micro-controller of the control circuit 30 may execute firmware to provide the EXIF file format component 34. Alternatively, the EXIF file format component 34 may be a dedicated hardware circuit or a combination of hardware and software.

Referring again to FIG. 3, the portions of the camera 10 represented by the elements 22, 24, 26, 28 and 36 process the output signals from the image sensor as pictures are taken in succession to generate sets of pixels representative of a plurality of images of objects or scenes of interest. The control circuit 30 converts these sets of pixels into a plurality of image files representing images of the objects and scenes of interest. The image files are in the EXIF file format and represent a sequence of pictures taken with the camera 10.

These image files may be stored in an internal memory 38 and can be conveyed via an output port 40 mounted in the housing 14 of the camera to a cable 42 connected to the printer 12. By way of example, the memory 38 may comprise a non-volatile random access memory ("NVRAM") portion and a volatile RAM portion. Alternatively, it will be understood by those skilled in the art that the cable 42 could be connected to a PC (not illustrated) so that the image files in EXIF format could be further processed in the PC, displayed on its monitor, or downloaded to a printer connected to the PC. Alternatively, as described herein later on in detail, the user of the camera 10 may choose to transmit selected image files to the printer 12 via a removable memory 44.

The memory 44 (FIG. 3) is preferably a flash memory card that plugs into a female connector 46 in a receptacle or slot 48 formed in an outer surface of the camera housing 14. A floppy diskette or some other form of removable storage media could be used instead of a flash memory card. As another alternative, the user of the camera 10 may choose to transmit selected image files to the printer 12 by utilizing a wireless data link including an infrared (IR) transmitting device 50 (FIGS. 2 and 3) mounted in an outer surface of the camera housing 14. In such a case, the printer 12 receives the IR radiation in which image data has been encoded via an IR receiver 52 (FIG. 3) mounted on the exterior of the printer housing. The printer 12 has conventional circuitry connected to the IR receiver 52 for decoding the image data from the received IR signals. The IR transmitting device 50 is connected to an IR driver circuit 54 which is controlled by control circuit 30 to transmit the desired image data as hereafter described.

A display 56 (FIG. 3) is mounted in the top side of the camera housing 14 for reproducing color images for viewing by the camera user. The display 56 is preferably an LCD that can display alphanumeric and graphical information. The display 56 is driven in conventional fashion by the LCD driver circuit 58 (FIG. 3) controlled by the control circuit 30. The LCD driver circuit 58 also drives the internal LCD 17*b* on which recorded images are displayed upon command for viewing through the eyepiece 17*a* of the camera viewfinder. The display 56 can display a series of menus providing a plurality of command options that can be selected by the user as part of a graphical user interface (GUI) generated by the control circuit 30 using a control program stored in the internal memory 38.

A plurality of manually actuable controls 62, 64, 66*a*, 66*b*, 68, 70*a* and 70*b* (FIGS. 2 and 3) are mounted in the outer surface of the camera housing 14 so that they can be readily manipulated by the fingers of the user while viewing the display 56. By way of example, the manually actuable controls 62, 64, 66*a*, 66*b*, 68, 70*a* and 70*b* may be of the pushbutton type. The manually actuable controls 62, 64, 66*a*, 66*b*, 68, 70*a* and 70*b* interface with the control circuit 30 through a switch input/output (I/O) buffering device 71 (FIG. 3) in conventional fashion. The pushbutton 62 may be depressed to power the camera 10 ON and OFF and the pushbutton 64 may be depressed to "take a picture". The manually actuable controls 66*a* and 66*b* may be depressed to scroll up and down through command options displayed on the display 56. The pushbutton 68 depressed to select the command option currently highlighted or marked with a cursor. The other push buttons 70*a* and 70*b* may be depressed to control other functions such as current strobe mode selection and date/time entry, respectively. The current strobe mode can be selected from a "strobe ON", a "strobe OFF", an "AUTOMATIC" strobe mode, a "RED EYE AUTO" strobe mode and a "RED EYE ON" strobe modes. Each time the pushbutton 70*a* is depressed an indication of the current strobe mode can be displayed by the LCD 56. When the desired current strobe mode is displayed, it can be selected and activated in the camera 10, by, for example, depressing the pushbutton 68.

A conventional strobe charge/discharge circuit 72 (FIG. 3) is connected between the control circuit 30 and a strobe or flash 74 (FIGS. 2 and 3) mounted in a front side of the camera housing 14. The strobe 74 may comprise a gas discharge tube which will flash a bright light on the object or scene of interest when "fired" or energized by the strobe charge/discharge circuit 72 (FIG. 2) in response to a command from the control circuit 30. The strobe 74 is fired in accordance with the current strobe mode during a current picture taking session. The strobe charge/discharge circuit 72 receives power from the battery 31. When the DSC 10 is set to ane AUTOMATIC strobe mode the ambient luminescence is detected by the control circuit 30 of the DSC 10 each time a picture is taken and the strobe 74 is energized if needed in accordance with pre-programmed luminescence levels. To facilitate this operation, the DSC 10 includes a luminescence detector circuit 76 (FIG. 3) that receives the analog output signal of a suitable luminescence detector 78 (FIGS. 2 and 3) mounted in the front side of the camera housing 14.

The control circuit 30 also causes a series of menus to be displayed on the display 56 providing command options that can be selected upon manual actuation of one of the pushbutton controls. Upon manual actuation of certain ones of the pushbutton controls in the appropriate sequence the control circuit 30 causes individual stored images to be displayed on the small internal LCD 17*b* so that they can be viewed via the eyepiece 17*a* (FIGS. 2 and 3) of the viewfinder. The LCD 56 on top of the camera housing 14 is used solely for displaying alphanumeric data and graphic symbols as part of the GUI. The control circuit 30 causes a markup file to be generated in response to the user's selection of a first predetermined sequence of command options via manipulation of the pushbutton controls. The markup file represents the designation of image files for further processing. The markup file can include information not only about which pictures are being selected, but how many copies are desired. In addition, the markup file can also include information about image enhancements to be performed on the selected images, such as rotation, cropping, brightening, etc. Once the markup file has been generated, the user can, by following the appropriate menus on the display 56 and actuating the appropriate pushbutton controls, send the designated image files to the printer 12 via the cable 42, removable memory 44 or IR transmitter 50. Regardless of the mode of data transfer, the printer 12 receives all of the selected image files designated in the markup file and all of the information about quantity and enhancements.

Figure 4:
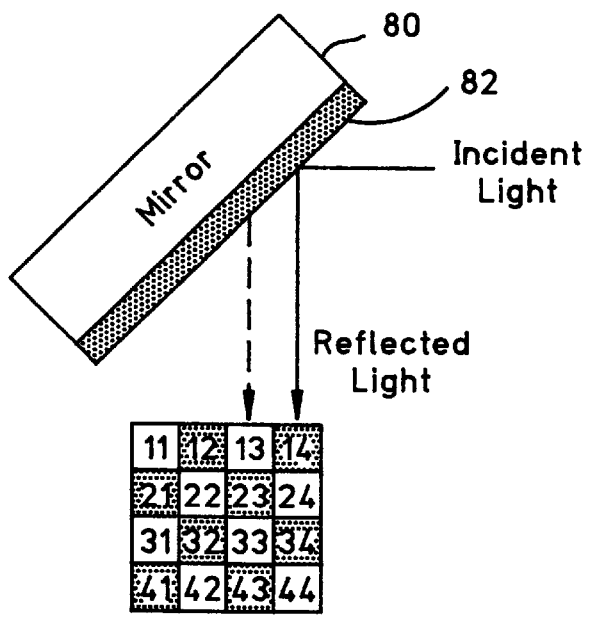
FIG. 4 illustrates the use of a coated mirror used in the camera of FIG. 2 in accordance with the present invention.

Referring to FIG. 4, in accordance with my invention, a mirror 80 is mounted inside the camera housing 14 for reflecting light from the lens 16 to the image sensor 18. The mirror 80 is provided with a partially reflective coating 82 of a material such as glass that causes the reflected image to be doubled. The second image generated by the coating 82 is shifted a predetermined amount from the original or first image that is generated by the reflective, e.g. silvered, surface of the mirror 80. The glass coating 82 has a preselected index of refraction and its thickness is a few microns or less. The predetermined amount of shift is preferably substantially equal to a width of one pixel, such that the light is duplicated in the manner indicated by the numerals in the mosaic pattern illustrated in FIG. 4 and in the table below. In FIG. 4, the solid line illustrates the light reflected off the surface of the mirror 80 and the dashed line illustrates the light reflected off the coating 82.

| Original | New |
|---|---|
| 14 | 13, 14 |
| 13 | 12, 13 |
| 12 | 11, 12 |
| 24 | 23, 24 |
| 23 | 22, 23 |
| 22 | 21, 22 |
| 34 | 33, 34 |
| 33 | 32, 33 |
| 32 | 31, 32 |
| 44 | 43, 44 |
| 43 | 42, 43 |
| 42 | 41, 42 |

Figure 1:
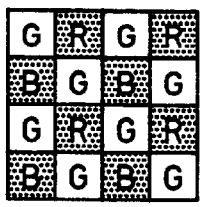
FIG. 1 is an illustration of the conventional Bayer mosaic pattern of color filter elements used in a one-chip digital still camera.

In the camera 10, the color filter elements are arranged in a predetermined mosaic pattern such as the Bayer pattern illustrated in FIG. 1. Other color filter element patterns that are well known to those skilled in the art could be utilized, such as striped patterns. Without the partially reflective mirror 80, pixel location 13 would be sensitive to green light only at that pixel location and pixel location 14 would be sensitive to red light only at that pixel location. Consequently, for example, the intensity of the green light falling on pixel location 14 would not be directly measurable. It could only be estimated using various algorithms depending upon the amount of light detected at the adjacent pixel locations.

Figure 5:
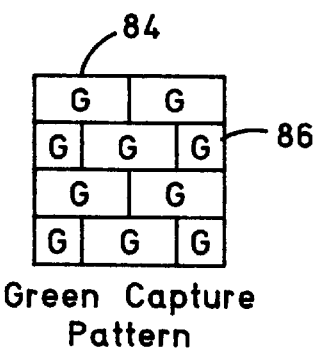
FIG. 5 illustrates a green capture pattern that effectively results from the image capture system illustrated in FIG. 4.
Figure 6:
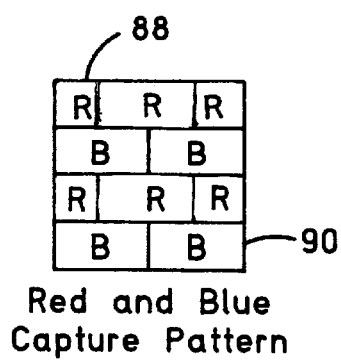
FIG. 6 illustrates red and blue capture patterns that effectively result from the image capture system illustrated in FIG. 4.

FIGS. 5 and 6 illustrate green capture and red and blue capture patterns that effectively result from the image shifting mirror 80. A portion of the incident light that would otherwise strike pixel location 14 is re-directed to pixel location 13 which is sensitive to green. Consequently, the sum of the intensity of green light at pixel locations 13 and 14 in the original image is present at pixel location 13. The resulting wide green color detection regions 84 (FIG. 5) diagrammatically illustrate the averaging that takes place with respect to the detection of incident green light. The resulting narrow green color detection regions 86 merely represent the sensitivity at the edge of the image sensor 18. It will of course be understood that the image sensor 18 has thousands of individual photosensitive elements. The resulting red color detection regions 88 (FIG. 6) are arranged in alternating rows with the resulting blue color detection regions 90. As illustrated by the capture patterns of FIGS. 5 and 6, all of the green color component information in the original image is captured along with fifty percent of the red color component information and fifty percent of the blue color component information.

Thus, in the illustrated embodiment my invention provides a camera with improved image color detection. Blurring and undesirable artifacts such as color fringing at the edges of the color digital still image are reduced. My method for achieving these objectives may be characterized as an antialiasing method in that, broadly speaking, it utilizes a form of averaging to reduce fringing at the edges of the objects depicted in the color picture.

It will be understood by those skilled in the art that my color image capturing invention is applicable to other devices besides DSCs, such as video cam corders, direct display systems, and other color image processing systems. The patterns illustrated in FIGS. 5 and 6 could be made less sensitive to horizontal lines by rotating them ninety degrees from their illustrated orientations. Non-uniform coatings could be used to produce a moire (i.e. wavy) pattern, that would re-direct portions of the light from other pixel locations onto a single predetermined pixel location. Additional image shifting devices can be inserted into the optical path, such as a second mirror, so that color information can be averaged over more than one pixel, both row-wise and column-wise. The amount of shift could be varied, e.g. one-half pixel, one pixel, two pixels. Depending upon the nature of the color image capturing system, other image forming devices besides a traditional lens may be used to direct the incident light through the color filters onto the image sensor, including prisms, mirrors and fiber optic devices. The image shifting means could similarly include such devices. It is not necessary for image data to be stored as it may be directly displayed. RGB, CMY, CMYA and other traditional filter element combinations may be utilized in well known mosaic or striped patterns, including, but not limited to, the Bayer pattern. Therefore, the protection afforded my invention should only be limited in accordance with the following claims.

I claim:

1. A color image capturing system, comprising:
   an image sensor for receiving light reflected by an object or a scene of interest representing an image, the image sensor including a plurality of individual photosensitive elements arranged in an array, each photosensitive element representing a corresponding pixel location in the image;
   a plurality of individual color filter elements each positioned adjacent a corresponding one of the photosensitive elements of the image sensor;
   means for shifting the light reflected by the object or scene of interest so that a portion of the light that would otherwise fall on a single photosensitive element is divided between at least two adjacent photosensitive elements; and
   the plurality of color filter elements being arranged in a predetermined pattern for permitting the photosensitive elements to detect the intensity of the light incident thereon so that a plurality of output signals from the image sensor can be used to reproduce a color image of the object or scene of interest.

2. The system according to claim 1 wherein the shifting means generates a double image including first and second images spaced apart a predetermined distance.

3. The system according to claim 2 wherein the predetermined distance is substantially equal to a width of one pixel.

4. The system according to claim 1 wherein the shifting means includes a partially reflective mirror.

5. The system according to claim 4 wherein the partially reflective mirror has a coating of a glass material having a preselected index of refraction.

6. The system according to claim 5 wherein the glass material coating has a thickness which shifts the second image approximately one pixel apart from the first image.

7. The system according to claim 1 wherein the individual color filter elements include red, green and blue filter elements.

8. The system according to claim 1 and further comprising means for receiving the reflected light from the object or scene of interest and transmitting the light to the shifting means.

9. The system according to claim 1 and further comprising means for processing a plurality of output signals from the image sensor.

10. The system according to claim 9 and further comprising control means connected to the processing means for generating an image file and storing the image file in a memory.

11. A method of capturing a color image, comprising the steps of:
- transmitting light reflected by an object or scene of interest onto an image sensor including a plurality of individual photosensitive elements arranged in an array, each photosensitive element representing a corresponding pixel location in the image;
- the light traveling through a plurality of individual color filter elements each positioned adjacent a corresponding one of the photosensitive elements of the image sensor;
- shifting the light before it reaches the color filter elements so that a portion of the light that would otherwise fall on a single photosensitive element is divided between at least two adjacent photosensitive elements; and
- the plurality of individual color filter elements being arranged in a predetermined pattern for permitting the photosensitive elements to detect the intensity of the light incident thereon so that a plurality of output signals from the image sensor can be used to reproduce a color image of the object or scene of interest.

12. The method of claim 11 wherein the shifting generates a double image including first and second images spaced apart a predetermined distance.

13. The method of claim 12 wherein the predetermined distance is substantially equal to a width of one pixel.

14. The method of claim 11 the dispersal is performed by reflecting the light from the object or scene of interest off a partially reflective mirror.

15. The method of claim 14 wherein the partially reflective mirror has a coating of a glass material with a preselected index of refraction.

16. The method of claim 11 wherein the color filter elements include red, green and blue elements.

17. The method of claim 11 wherein the color filter elements are arranged in a predetermined mosaic pattern.

18. The method of claim 11 wherein the reflected light is transmitted with a lens that focuses the reflected light onto the image sensor.

19. The method of claim 11 and further comprising the step of processing the output signals from the image sensor and generating an image file representing a still color picture of the image.

20. The method of claim 19 and further comprising the step of storing the image file in a memory.

* * * * *